(12) United States Patent
Stone

(10) Patent No.: US 6,435,534 B1
(45) Date of Patent: Aug. 20, 2002

(54) SIDE RUNNER ASSEMBLY FOR A VEHICLE HAVING A DROPPING STEP

(76) Inventor: Harry W. Stone, 7650 Independence Ct., Colorado Springs, CO (US) 80920

(*) Notice: Subject to any disclaimer, the term of this patent is extended or adjusted under 35 U.S.C. 154(b) by 0 days.

(21) Appl. No.: 09/605,749

(22) Filed: Jun. 29, 2000

(51) Int. Cl.[7] .............................. B60R 3/02; E06C 5/04
(52) U.S. Cl. ..................... 280/163; 280/166; 182/127; 182/91
(58) Field of Search .............................. 280/163, 164.1, 280/166, 169; 293/128; 182/127, 91

(56) References Cited

U.S. PATENT DOCUMENTS

| | | | | |
|---|---|---|---|---|
| 4,180,143 A | * | 12/1979 | Clugston | 280/166 |
| 4,185,849 A | * | 1/1980 | Jaeger | 280/166 |
| D284,752 S | * | 7/1986 | Horton, Jr. | 280/166 |
| 4,935,638 A | * | 6/1990 | Straka | 280/166 |
| 5,358,268 A | * | 10/1994 | Hawkins | 280/166 |
| 5,697,626 A | * | 12/1997 | McDaniel et al. | 280/166 |
| 6,135,472 A | * | 10/2000 | Wilson et al. | 280/166 |
| 6,158,756 A | * | 12/2000 | Hansen | 280/166 |
| 6,168,176 B1 | * | 1/2001 | Mueller | 280/166 |

* cited by examiner

Primary Examiner—Lanna Mai
Assistant Examiner—Jeffrey Restifo
(74) Attorney, Agent, or Firm—G. F. Gallinger

(57) ABSTRACT

A retractable step which is adequately functional, and which virtually automatically shifts between its in-use and storage position. A side runner assembly having a dropping step for a vehicle includes: an elongate member having a front and rear portion, each of the front and rear portions rigidly attached to the frame by a lateral member; and, a dropping central step portion carried by a lateral member, one side portion of the lateral member rigidly attached to the central portion, and the other opposite side portion movably attached to the frame. A spring upwardly biases the central portion; and the central portion is restrained in horizontal alignment with the front and rear portion of the side rail assembly. The central step portion is normally maintained in alignment with the front and rear portions of the assembly and drops to an operative position when and only downward force is applied thereon. In a preferred embodiment the front, rear, and central step portions of the side rail assembly as well as the lateral members, have round tubular cross sections. The lateral members comprise arms and the opposite side portion of the arm carrying the central portion is pivotably attached to the frame.

19 Claims, 1 Drawing Sheet

_US 6,435,534 B1_

SIDE RUNNER ASSEMBLY FOR A VEHICLE HAVING A DROPPING STEP

FIELD OF THE INVENTION

This invention relates to accessories for sports utility, light trucks and off road vehicles. More particularly this invention relates to a tubular side runner assembly having a dropping step. It has particular advantageous application when the vehicle is elevated because of its suspension, drive train, or oversized wheels and tires.

BACKGROUND OF THE INVENTION

Trucks, sports utility vehicles, and other relatively large vehicles are becoming increasingly popular with consumers. Some of these vehicles have even higher floors when they are adopted for off road applications with oversized wheels and tires, heavy duty suspensions, and/or four wheel drives. There is a growing need for a dropping step to assist not only smaller, but aging individuals who must climb into these relatively high vehicles. It is necessary that the step be upwardly retractable so that during motion it would not extend below the bottom of the truck, where it would potentially catch objects which would otherwise pass beneath the vehicle. But in addition to being retractable this step must be convenient to use. It should move between an in-use position and a storage position quickly and without much effort—almost automatically. A user typically lifts himself with his arms. Ideally the step should be able to be shifted between its positions without using the arms so that the user could concurrently carry an object and pull himself upwards with his other arm without expending either time or attention on shifting the moveable step. And finally, to gain user acceptance the step must not only be functional and convenient to use but additionally attractive, compact, and lightweight. Positioned prominently on the exterior of the vehicle, the retractable step must harmonize with, and complement a sporty and racy vehicle.

OBJECTS OF THE INVENTION

It is an object of this invention to disclose a retractable step for a vehicle. It is an object of this invention to disclose a retractable step which is adequately functional, and which virtually automatically shifts between its in-use and storage position. It is yet a further object of this invention to disclose a retractable step which is minimally bulky so that its in storage position will be minimally obtrusive. It is yet a final object of this invention to disclose a retractable step which is so inconspicuous, compact, and so lightweight, that it is virtually invisible on most utility and sports vehicles.

One aspect of this invention provides for a side runner assembly having a dropping step for a vehicle comprising: an elongate member having a front and rear portion, each of the front and rear portions rigidly attached to the frame by a lateral member; and, a dropping central step portion carried by a lateral member, one side portion of the lateral member rigidly attached to the central portion, and the other opposite side portion movably attached to the frame. Bias means upwardly bias the central portion; and an upper restraint means maintains the central portion in horizontal alignment with the front and rear portion of the side rail assembly. The central step portion is normally maintained in alignment with the front and rear portions of the assembly and drops to an operative position when and only downward force is applied thereon.

In a preferred aspect of the invention the front, rear, and central step portions of the side rail assembly as well as the lateral members, have round tubular cross sections. The lateral members comprise arms and the opposite side portion of the arm carrying the central portion is pivotably attached to the frame.

Various other objects, advantages and features of this invention will become apparent to those skilled in the art from the following description in conjunction with the accompanying drawings.

FIGURES OF THE INVENTION

Figure 1:
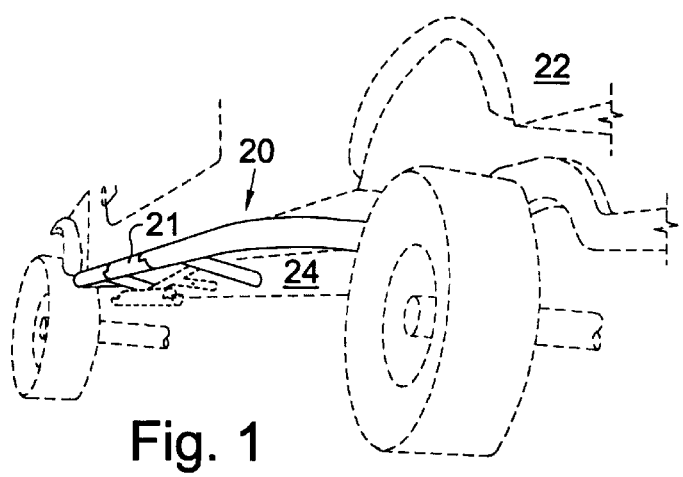
FIG. 1 is a perspective view of a vehicle having a side runner assembly having a dropping step.

The following is a discussion and description of the preferred specific embodiments of this invention, such being made with reference to the drawings, wherein the same reference numerals are used to indicate the same or similar parts and/or structure. It should be noted that such discussion and description is not meant to unduly limit the scope of the invention.

DESCRIPTION OF THE INVENTION

Figure 2:
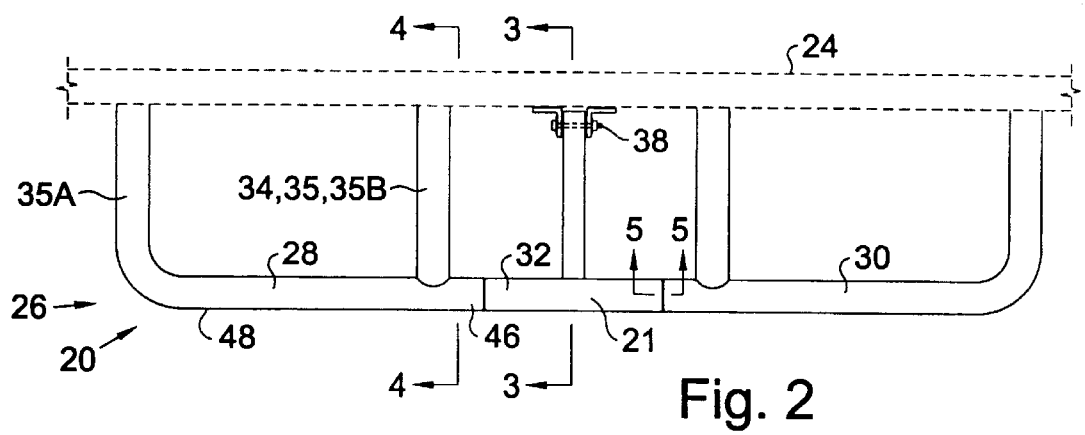
FIG. 2 is a plan view showing the side runner assembly having the dropping step.

Turning now to drawings and more particulary to FIG. 1 we have a perspective view of a vehicle 22 having a side runner assembly 20 having a dropping step 21. FIG. 2 is a plan view of the side runner assembly 20 having the dropping step 21. The runner assembly 20 comprises an elongate member 26 having a front portion 28 and a rear portion 30, each rigidly attached to the vehicle's frame 24 by a lateral member 34. A dropping central step portion 32 is carried by a lateral member 34. One side portion of the lateral member 34 is rigidly attached to the central portion 32, and the other opposite side portion thereof is movably attached to the vehicle's frame 24 by a pivot member 38.

Figure 3:
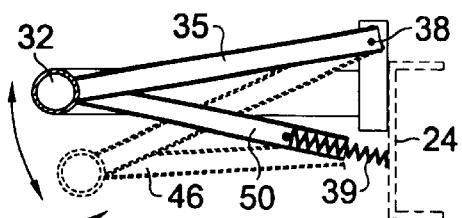
FIG. 3 is a cross sectional view taken along line 3—3 on FIG. 2 showing the step mechanism.

FIG. 3 is a cross sectional view taken along line 3—3 on FIG. 2 showing the step mechanism 36. A lower spring/support arm 50 has an outer end portion carried by on outer end portion of the central step portion's lateral arm 35, and has an inner end portion carrying a spring 39 which has an inner end in contact with a lower portion of the vehicle's frame 24 so that the spring 39 will normally maintain the central step portion 32 in its upper aligned position; and compress to allow the inner end portion of the lower spring/support arm 35 to contact the vehicle's frame 24 and support the central step portion 32 in its dropped operative position 44.

Most preferably the front, rear, and central step portions 28,30,32 have a generally similar lateral cross section so that the central step portion 32 is largely individually inconspicuous when it is maintained in its upper aligned position. In the most preferred embodiment of the invention the lateral members 34 comprise arms 35 and the opposite side portion of the arm 35 carrying the central portion 32 is pivotably 38 attached to the vehicle's frame 24. In the most preferred embodiment of the invention the front, rear, and central step portions 28,30,32 of the side runner assembly 20 as well as the arms 35, have round tubular cross sections.

Referring back to FIG. 2, in the most preferred embodiment of the invention the front and rear lateral arms 35 have a cross section which is generally the same as the cross section of the front, rear and central step portions 28,30,32 of the side runner assembly 20. In the most preferred aspect of the invention each of the front and rear portions 28,30 of the side runner assembly 20 have an inner step end portion 46, and an outer end portion 48; and each of the front and rear end portions 28,30 has two arms one extending perpendicularly from the inner step end portion 46 and the other extending axially and then curving, to perpendicularly project from the outer end portion 48 towards the vehicle's frame 24.

FIG. 3 is a cross sectional view taken along line 3—3 on FIG. 2 showing the step mechanism 36. A lower spring/support arm 50 has an outer end portion carried by on outer end portion of the central step portion's lateral arm 35, and has an inner end portion carrying a spring 38 which has an inner end in contact with a lower portion of the vehicle's frame 24 so that the spring 38 will normally maintain the central step portion 32 in its upper aligned position; and compress to allow the inner end portion of the lower spring/support arm 35 to contact the vehicle's frame 24 and support the central step portion 32 in its dropped operative position 44.

Figure 4:
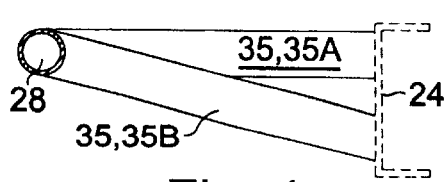
FIG. 4 is a cross sectional view taken along line 4—4 on FIG. 2 showing a preferred arrangement of the arms carrying a front portion of the runner assembly.

FIG. 4 is a cross sectional view taken along line 4—4 on FIG. 2 showing a preferred arrangement of the arms 35 carrying a front portion 28 of the runner assembly 20. In the most preferred embodiment of the invention the outer arms 35A extends to the vehicle's frame 24 generally horizontally from the outer end portion of the front portion 28 as well as the outer end portion of the rear portion 30 of the elongate member 26. The inner step end portion arms 35B extend inwardly and downwardly towards the frame 24 to provide better support for a vertical load there above.

Figure 5:
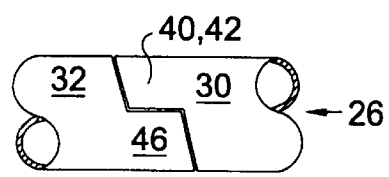
FIG. 5 is a cross sectional view of the runner assembly showing a preferred upper restraint means for the step portion thereof.

FIG. 5 is a cross sectional view of the runner assembly 20 showing a preferred upper restraint means for the step portion thereof. The upper restraint means 40 comprises a lower portion of opposite ends of the central step portion 32 being longitudinally extended 46 and lower inner end portions of the adjacent front and rear portions of the elongate member 26 being matingly shortened so that when said portions are horizontally aligned they will combine to have a generally uniform outer cross section therealong.

The side runner assembly has been constructed from 3" diameter chromed tubing. It has a width of approximately 12" and an overall length of approximately 50". It may be welded or bolted to a vehicle's frame 24.

While the invention has been described with preferred specific embodiments thereof, it will be understood that this description is intended to illustrate and not to limit the scope of the invention, which is defined by the following claims.

I claim:

1. A side runner assembly having a dropping step for a vehicle having a frame comprising:
    an elongate member having
        elongate front and rear fixed portions, each extending generally parallel and rigidly attached to the frame by a lateral member; and,
    a dropping central step portion carried by a lateral member, one side portion of the lateral member rigidly attached to the central portion, and the other opposite side portion movably attached to the frame;
    bias means to upwardly bias the central portion; and,
    an upper restraint means wherein an upper portion of a fixed portion of the elongate member overlaps an end portion of the dropping central portion to generally maintain a bottom side portion of the central portion in horizontal alignment with a bottom side portion of the front and rear portions of the side runner assembly for protection of the dropping central step portion from possible obstructions beside and beneath the vehicle;
    so that the central step portion is normally maintained in alignment with the front and rear portions of the assembly and drops to an operative position when and only when downward force is applied thereon.

2. A side runner assembly as in claim 1 wherein the front, rear, and central step portions thereof have a generally similar lateral cross section so that the central step portion is largely individually inconspicuous when it is maintained in its upper aligned position with the front and rear portions.

3. A side runner assembly as in claim 2 wherein the lateral members comprise arms and wherein the opposite side portion of the arm carrying the central portion is pivotably attached to the frame.

4. A side runner assembly as in claim 3 wherein the front, rear, and central step portion of the side runner assembly as well as the arms, have tubular cross sections.

5. A side runner assembly as in claim 4 wherein the tubular cross sections are round.

6. A side runner assembly as in claim 5 wherein the front and rear lateral arms have a cross section which is generally the same diameter as the cross section of the front, rear and central step portions of the side runner assembly.

7. A side runner assembly as in claim 6 wherein the outer arms extend to the frame generally horizontally from the outer end portion of the front portion and the outer end portion of the rear portion of the side runner assembly; and wherein the dropping central step portion has an arm extending inwardly and downwardly towards the frame to provide better support for a vertical load there above.

8. A side rail assembly as in claim 5 further comprising a lower spring/support arm having an outer end portion carried by on outer end portion of the central step portion's lateral arm, and having an inner end portion carrying a spring which has an inner end in contact with a lower portion of the vehicle frame so that the spring will normally maintain the central step portion in its upper aligned position and compress to allow the inner end portion of the lower spring/support arm to contact the frame and support the central step portion in its dropped operative position.

9. A side assembly as in claim 1 wherein the upper restraint means comprises an arrangement on the adjacent end protions of the front, central step and rear portions of the elongate member so that the central step portion cannot move upwardly beyond an a haorizontally aligned position with the front and rear portions.

10. A side runner assembly as in claim 9 wherein each of the front and rear portions of the side runner assembly have an outer and an inner step end portion and where each of the front and rear end portions have two arms; one extending perpendicularly from the inner step end portion, and the other extending axially and then curving, to perpendicularly project towards the frame.

11. A side runner assembly as in claim 1 wherein the upper restraint means comprises a lower portion of opposite ends of the central step portion being longitudinally extended; and lower inner end portions of the adjacent front and rear portions of the elongate member being matingly shortened; so that when said portions are horizontally aligned they will combine to have a generally uniform outer cross section therealong.

12. A side runner assembly having a dropping step for a vehicle having a frame comprising:

an elongate member having elongate front and rear fixed portions, each extending generally parallel and rigidly attached to the frame by a lateral member; and, a dropping central step portion carried by a lateral member, one side portion of the lateral member rigidly attached to the central portion, and the other opposite side portion pivotably attached to the frame;

said front, rear, and central step portions thereof having a generally similar lateral cross section so that the central step portion is largely individually inconspicuous when it is maintained in its upper aligned position with the front and rear portions;

said lateral members including a lower spring/support arm having an outer end portion carried by on outer end portion of the central step portion's lateral arm, and having an inner end portion carrying a spring which has an inner end in contact with a lower portion of the vehicle frame so that the spring will normally maintain the central step portion in its upper aligned position and compress to allow the inner end portion of the lower spring/support arm to contact the frame and support the central step portion in its dropped operative position; and, an upper restraint means to maintain the central portion in horizontal alignment with the front and rear portion of the side runner assembly;

so that the central step portion is normally maintained in alignment with the front and rear portions of the assembly and drops to an operative position when and only when downward force is applied thereon.

13. A side runner assembly as in claim 12 wherein the front, rear, and central step portions thereof have a generally similar lateral cross section so that the central step portion is largely inconspicuous when it is maintained in its upper aligned position with the front and rear portions.

14. A side runner assembly as in claim 13 wherein the front, rear, and central step portions of the side runner assembly as well as the arms, have tubular cross sections.

15. A side runner assembly as in claim 14 wherein the tubular cross sections are round.

16. A side runner assembly as in claim 15 wherein the upper restraint means comprises a lower portion of opposite ends of the central step portion being longitudinally extended; and lower inner end portions of the adjacent front and rear portions of the elongate member being matingly shortened; so that when said portions are horizontally aligned they will combine to have a generally uniform outer cross section therealong.

17. A side runner assembly as in claim 14 wherein the front and rear lateral arms have a cross section which is generally the same diameter as the cross section of the front, rear and central step portions of the side runner assembly.

18. A side runner assembly as in claim 17 wherein each of the front and rear portions of the side runner assembly have an outer and an inner step end portion and where each of the front and rear end portions has two arms; one extending perpendicularly from the inner step end portion, and the other extending axially and then curving, to perpendicularly project towards the frame.

19. A side runner assembly as in claim 17 wherein the outer arms extend to the frame generally horizontally from the outer end portion of the front portion and the outer end portion of the rear portion of the side runner assembly; and wherein the inner step end portion arms extend inwardly and downwardly towards the frame to provide better support for a vertical load there above.

* * * * *